United States Patent
Asai

(10) Patent No.: US 9,019,530 B2
(45) Date of Patent: Apr. 28, 2015

(54) STORAGE MEDIUM HAVING PRINTING PROGRAM STORED THEREIN AND PRINTING APPARATUS

(75) Inventor: Daisuke Asai, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 635 days.

(21) Appl. No.: 13/313,392

(22) Filed: Dec. 7, 2011

(65) Prior Publication Data

US 2012/0188563 A1 Jul. 26, 2012

(30) Foreign Application Priority Data

Jan. 20, 2011 (JP) ................................. 2011-010072

(51) Int. Cl.
*G06F 3/12* (2006.01)
*G06K 15/02* (2006.01)
*G06K 15/10* (2006.01)
*B41J 3/407* (2006.01)

(52) U.S. Cl.
CPC ............. *G06K 15/021* (2013.01); *B41J 3/4071* (2013.01); *G06K 15/10* (2013.01); *G06K 15/186* (2013.01); *G06K 15/1894* (2013.01)

(58) Field of Classification Search
USPC ............ 358/3.32, 1.12, 1.13, 1.15, 1.16, 501, 358/296
See application file for complete search history.

(56) References Cited

U.S. PATENT DOCUMENTS

| | | | |
|---|---|---|---|
| 2004/0263545 A1 | 12/2004 | Esaki et al. |
| 2005/0052483 A1 | 3/2005 | Esaki et al. |
| 2007/0097435 A1 | 5/2007 | Terajima |
| 2009/0231600 A1 | 9/2009 | Hashimoto |

FOREIGN PATENT DOCUMENTS

| | | | |
|---|---|---|---|
| CN | 1700985 A | 11/2005 |
| CN | 101531096 A | 9/2009 |
| JP | 2002-347964 A | 12/2002 |
| JP | 2002347964 A | 12/2002 |
| JP | 2004-122610 A | 4/2004 |
| JP | 2005-022114 A | 1/2005 |

(Continued)

OTHER PUBLICATIONS

JP Office Action dd Nov. 13, 2012, JP Appln. 2011-010072, partial English translation.

(Continued)

*Primary Examiner* — Vu B Hang
(74) *Attorney, Agent, or Firm* — Banner & Witcoff, Ltd.

(57) ABSTRACT

A printing program can be executed by a processing apparatus connected to a printing apparatus including a recording head transfer section for reciprocating, in a main scanning direction, a recording head for discharging ink, and a recording medium transfer section for moving the recording medium in a sub-scanning direction. The program determines total movement distances of an image at angles relative to an original position according to a first movement distance by which the recording head would move in the main scanning direction from a start of movement of the recording head to an end of discharging the ink medium if printing were performed and a second movement distance by which the recording medium would move in the sub-scanning direction if printing were performed. The program causes the printing apparatus to print the image at the angular position of the image corresponding to the smallest total movement distance.

8 Claims, 14 Drawing Sheets

(56) References Cited

FOREIGN PATENT DOCUMENTS

| JP | 2005-035692 A | 2/2005 |
| JP | 2005-212216 A | 8/2005 |
| JP | 2005-288859 A | 10/2005 |
| JP | 2007-129282 A | 5/2007 |
| JP | 4088771 B2 | 5/2008 |
| JP | 2009-214460 A | 9/2009 |
| JP | 2009-220390 A | 10/2009 |
| JP | 4457730 B2 | 4/2010 |
| JP | 2010-105301 A | 5/2010 |

OTHER PUBLICATIONS

Office Action with Search Report off Chinese Patent Application No. 20120016566.4, mailed Jan. 28, 2014.

STORAGE MEDIUM HAVING PRINTING PROGRAM STORED THEREIN AND PRINTING APPARATUS

CROSS REFERENCE TO RELATED APPLICATION

This application claims priority from Japanese Patent Application No. 2011-010072 filed on Jan. 20, 2011. The entire content of each of this priority application is incorporated herein by reference.

BACKGROUND

As related art, a technology is known in which an image is printed on a recording medium by moving the recording medium in a sub-scanning direction while reciprocating, in a main scanning direction, a recording head for discharging ink toward the recording medium.

SUMMARY

However, according to the related art, depending on an angle of an image to be printed, a recording head inefficiently moves, and thus printing time becomes long. The present specification discloses a technology that can shorten a printing time when printing an image on a recording medium by moving the recording medium in a sub-scanning direction while reciprocating, in a main scanning direction, a recording head for discharging ink toward the recording medium.

It should be noted that aspects of the invention can be implemented in various forms such a printing method, a printing system, and a storage medium having a printing program stored therein.

DESCRIPTION

Embodiment 1 will be described with reference to FIGS. 1 to 9.

(1) Configuration of Personal Computer

Figure 1:
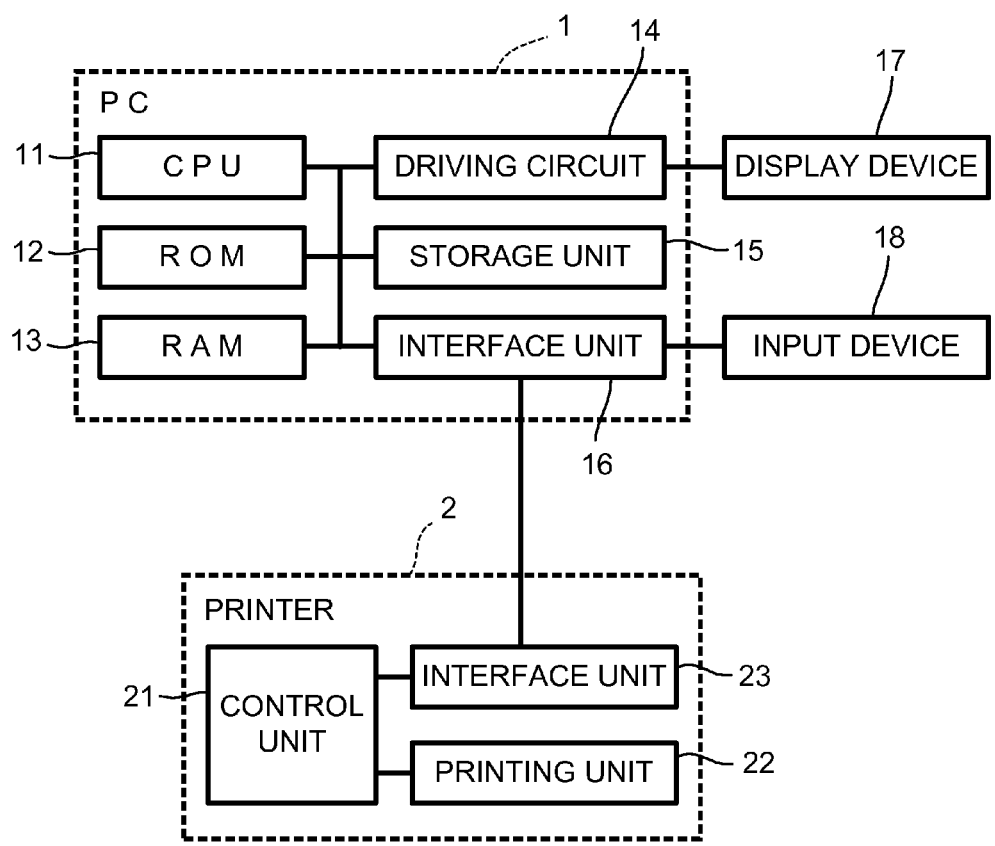
FIG. 1 is a block diagram illustrating the electrical configurations of a computer and a printer according to an illustrative embodiment.

FIG. 1 is a block diagram illustrating the electrical configurations of an information processing apparatus, for example a personal computer (PC) 1, and a printer 2 according to Embodiment 1.

The PC 1 includes a CPU 11, a ROM 12, a RAM 13, a display driving circuit (driving circuit) 14, a storage unit 15, and an interface unit 16.

The CPU 11 executes various programs stored in the ROM 12 and the storage unit 15 to control each unit of the PC 1. In the ROM 12, data and various programs to be executed by the CPU 11 are stored. The RAM 13 is used as a main storage device in order for the CPU 11 to execute various processes.

The display driving circuit 14 is a circuit for driving a display device 17 such as a CRT or a liquid crystal display, and is connected to the display device 17 via a cable.

The storage unit 15 is a device for storing various programs and data by using a nonvolatile memory such as a hard disk or a flash memory. In the storage unit 15, an operating system (OS), application programs (a word processor, spreadsheet software, a label surface printing program, etc.), a printing program, for example a printer driver program, for controlling the printer 2, and the like are stored. The label surface printing program is a program for, for example, selecting or creating an image to be printed on a label surface of an optical disc.

The interface unit 16 is configured as, for example, a USB host interface, and is connected to the printer 2 and an input device 18 such as a mouse and a keyboard via USB cables. It should be noted that the printer 2 may be connected to the PC 1 via a communication network such as a LAN or the Internet.

(2) Printer

Figure 2:
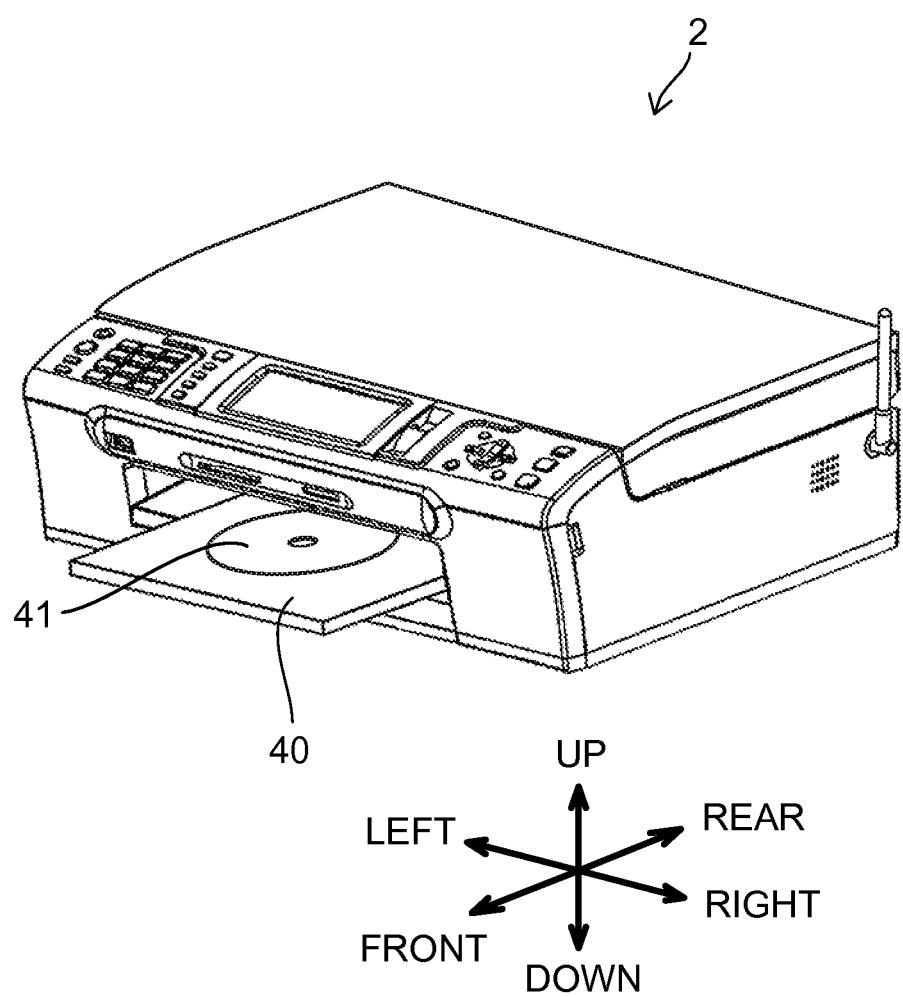
FIG. 2 is a perspective view illustrating the appearance of the printer.

FIG. 2 is a perspective view of an illustrative printing apparatus, which in this example corresponds to the printer 2. The printer 2 is configured to be able to print an image on a printing surface of a recording medium such as a label surface of a disc-shaped medium, in this instant an optical disc 41 that is placed on a tray 40. Specific examples of the optical disc 41 include a CDR, a DVD-R, and a Blu-ray Disc (registered trademark).

As shown in FIG. 1, the printer 2 includes a control unit 21, a printing unit 22, and an interface unit 23.

The control unit 21 includes a CPU, a ROM, and a RAM. The CPU executes various programs stored in the ROM to control each unit of the printer 2. In the ROM, data and the various programs to be executed by the CPU are stored. The RAM is used as a main storage device in order for the CPU to execute various processes.

The printing unit 22 is a device for printing an image by, for example, ink jet printing on a label surface of an optical disc or a recording medium other than an optical disc, such as a print sheet. The configuration of the printing unit 22 will be described below.

The interface unit 23 is configured as, for example, a USB client interface, and is communicatively connected to the PC 1 via a USB cable.

(3) Configuration of Printing Unit

Figure 3:
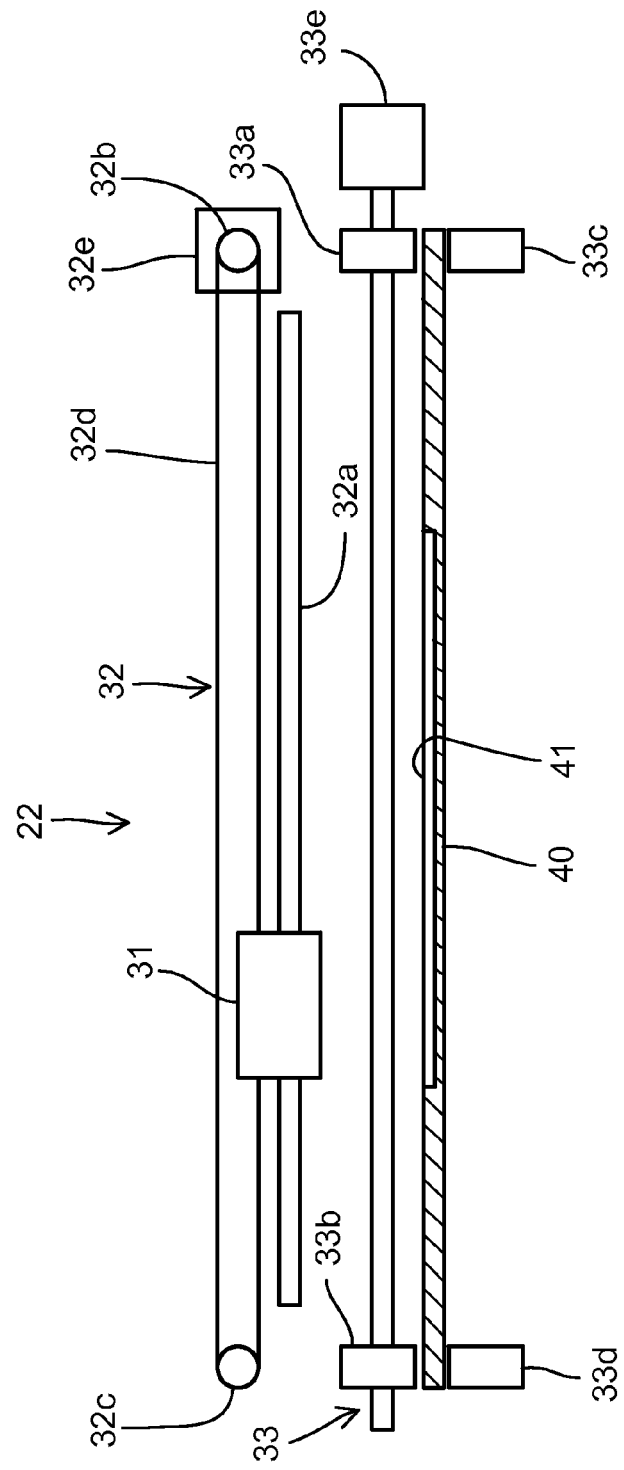
FIG. 3 is a schematic diagram illustrating the configuration of a printing unit.

FIG. 3 is a schematic diagram illustrating the configuration of the printing unit 22 viewed from the front side in FIG. 2.

The printing unit 22 includes a recording head 31, a recording head transfer section 32, and a recording medium transfer section such as a tray transfer section 33.

The recording head 31 is detachably mounted to a head carriage that is not shown. The recording head 31 includes a plurality of ink tanks each containing ink corresponding to individual colors such as CMYK colors, nozzles, ink passages connecting the ink tanks to the nozzles, a piezoelectric element, and a driving circuit for outputting, to the piezoelectric element, a driving signal corresponding to print data outputted from the PC 1. The recording head 31 discharges ink toward a recording medium such as a print sheet or an optical disc.

The recording head transfer section 32 includes a guide rod 32a, the head carriage that is slidably supported on the guide rod 32a and is not shown, a driving roller 32b, a driven roller 32c, a timing belt 32d extends around the driving roller 32b and the driven roller 32c, and a stepping motor 32e for rotationally driving the driving roller 32b. The recording head transfer section 32 reciprocates the head carriage, to which the recording head 31 is mounted, in a main scanning direction parallel to the guide rod 32a.

The tray transfer section 33 includes two driving rollers (33a and 33b) located so as to be spaced apart from each other in the main scanning direction, driven rollers (33c and 33d) located in corresponding relation to the driving rollers (33a and 33b), a stepping motor 33e for rotationally driving the driving rollers (33a and 33b), and a guide portion, not shown, for guiding the tray 40 in a sub-scanning direction (the vertical direction with respect to the sheet surface of FIG. 3) orthogonal to the main scanning direction.

The tray 40 is installed in the printer 2 from the front side, and the tray transfer section 33 transfers the tray 40 toward the rear side (in the sub-scanning direction). Printing on the label surface of the optical disc 41 placed on the tray 40 is performed while the tray 40 is transferred toward the rear side by the tray transfer section 33. When the printing ends, the tray transfer section 33 rotates the stepping motor 33e in the reverse direction and causes the tray 40 to be ejected toward the front side of printer 2.

(4) Printing Operation

Figure 4:
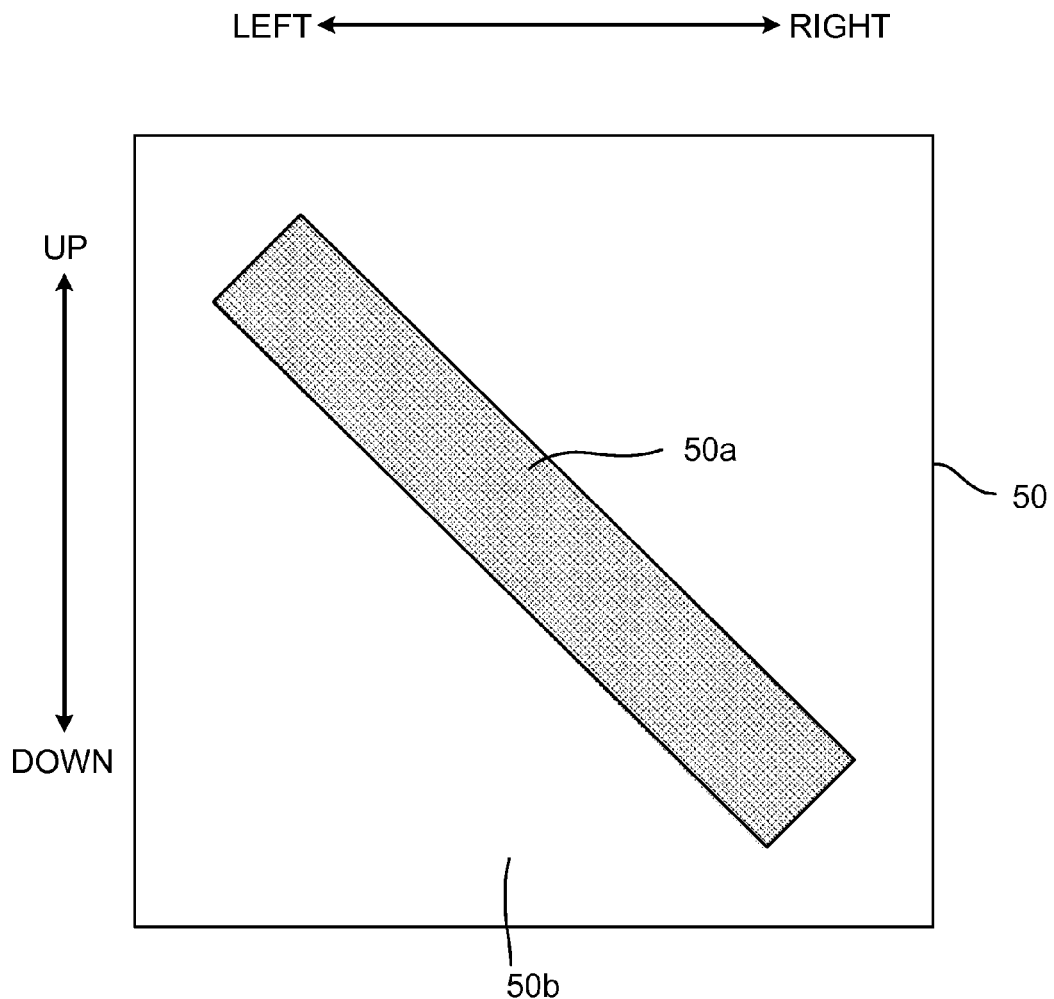
FIG. 4 is a schematic diagram illustrating an example of an image to be printed on a label surface of an optical disc.

FIG. 4 is a schematic diagram illustrating an example of an image 50 to be printed on the label surface of the optical disc 41. The illustrated example of the image 50 is composed of a rectangular image region 50a extending from the upper left to the lower right, and a non-image region 50b surrounding the image region 50a.

Here, the image region refers to a region on an image that represents color other than white color, and the non-image region refers to a region of an image that represents white color. The white color is, for example, a color represented by RGB=(255, 255, 255) in the case of an RGB color space. For the white color, coloring with ink is not performed. Thus, in a region of the label surface of the optical disc 41 where the non-image region is printed, the original color of the label surface remains.

It should be noted that if coloring is not performed even for a color of RGB=(250, 250, 250), the color corresponds to the white color. In other words, in this embodiment, the white color refers to color for which coloring with ink is not performed.

Figure 5:
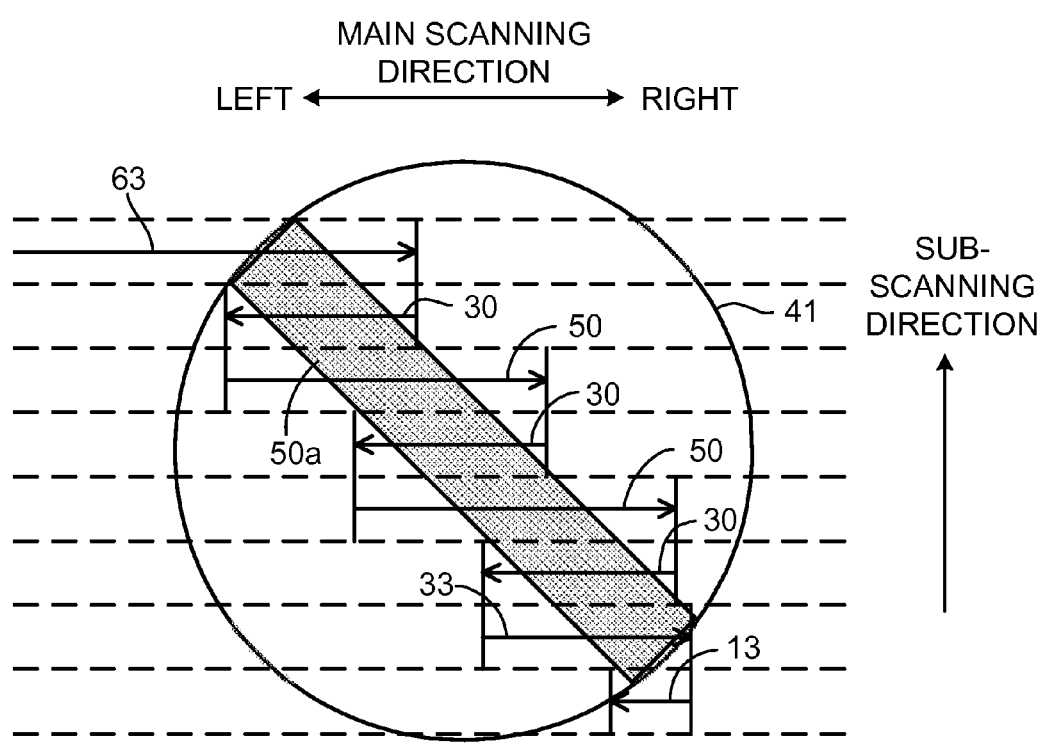
FIG. 5 is a schematic diagram illustrating a printing operation when printing the image shown in FIG. 4.

FIG. 5 is a schematic diagram illustrating a printing operation when the image 50 shown in FIG. 4 is printed on the label surface of the optical disc 41. Here, the recording head 31 prints an image during both the forward and rearward movements in the main scanning direction.

The arrows in the drawing indicate movements of the recording head 31, and the numeral (e.g., 63, 30, 50, etc.) pointing to each arrow indicates a movement distance. The unit of distance corresponds to a pixel number and not a distance in other units of measurement such as meters. This is because a print area for one pixel is constant and thus a pixel number can represent a distance.

When printing is not performed, the recording head 31 remains at the left end in the main scanning direction. When printing is started, the recording head 31 prints an image while moving rightward. When reaching the right end of the image region 50a (one of the right end of a line of the image region 50a being printed or the right end of the next line of the image region 50a that is located rightward of the other right end), the recording head 31 stops moving and waits until the optical disc 41 is transferred in the sub-scanning direction by one line.

Then, when the optical disc 41 is transferred by the tray transfer section 33 by one line, the recording head 31 starts moving again and prints the image 50 while moving leftward. When reaching the left end of the image region 50a (one of the left end of a line of the image region 50a being printed or the left end of the next line of the image region 50a that is located leftward of the other left end), the recording head 31 stops moving and waits until the optical disc 41 is transferred by one line.

The above operation is repeated until the printing of the image region 50a ends, whereby the image 50 is printed on the label surface of the optical disc 41.

(5) Total Distance of Total Movement Distance of Recording Head and Total Movement Distance of Optical Disc.

The total distance of a total movement distance of the recording head 31 and a total movement distance of the optical disc 41, if printing were performed with the image at an angle relative to its original position, may be determined by, for example, performing calculations according to the following Equation 1. In certain examples, this angle may be 0 degrees.

$$\text{Total distance} = \text{total movement distance of recording head 31} + \text{total movement distance of optical disc 41} \quad \text{Equation 1}$$

For example, in the example shown in FIG. 5, if the image 50 were to be printed at its original position inclined at an angle of 45 degrees relative to the main scanning direction. Then, the total movement distance of the recording head 31 and the total movement distance of the optical disc 41, if printing were performed with the image at an angle relative to its original position, may be determined by, for example, performing calculations according to the following Equations 2 and 3, respectively. In Equation 3, "10" represents a movement distance for one line, and "7" represents movement by 7 lines in the sub-scanning direction.

$$\text{Total movement distance of recording head 31} = 63 + 30 + 50 + 30 + 50 + 30 + 33 + 13 = 299 \quad \text{Equation 2}$$

$$\text{Total movement distance of optical disc 41} = 10 \times 7 = 70 \quad \text{Equation 3}$$

Therefore, in the example shown in FIG. 5, the total distance is the value indicated by the following Equation 4.

$$\text{Total distance} = 299 + 70 = 369 \quad \text{Equation 4}$$

The shorter the total distance is, the more the total time required to print an image can be shortened. Therefore, the shorter the total distance is, the more the time for printing on the label surface of the optical disc 41 can be shortened.

(6) Rotation of Image

Figure 6:
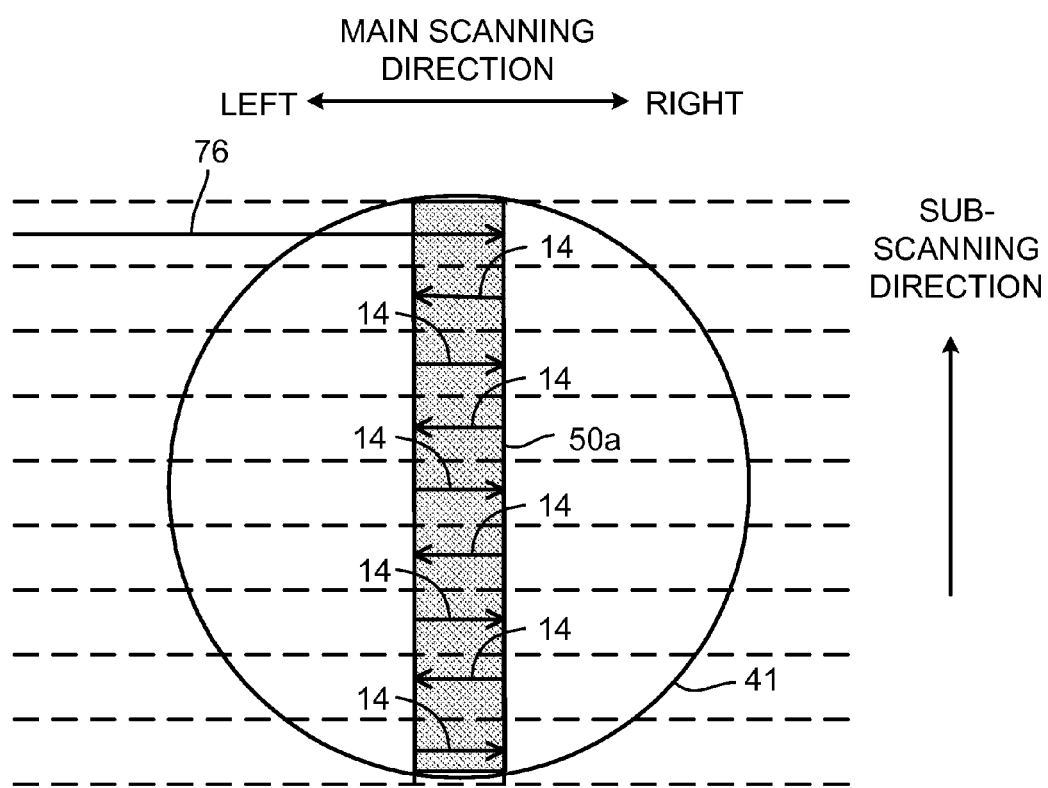
FIG. 6 is a schematic diagram illustrating a printing operation when rotating the image shown in FIG. 4 by a predetermined angle and printing the image.

FIG. 6 is a schematic diagram illustrating the distance that the recording head and recording medium would move during a printing operation if the image 50 were rotated by a predetermined angle from the original position of the image or a previously rotated position of the image and printed on the label surface of the optical disc 41.

Here, the total distance would be determined as if the image were rotated about a point on the image which point is located at the center of the printing (e.g., label) surface when the image would be printed on the label surface of the optical disc 41. In the example of FIG. 6, the image 50 would be rotated clockwise by 45 degrees. Thus, the image 50 would be parallel to the sub-scanning direction. It should be noted that the image may be rotated counterclockwise. In addition, the rotation angle is not limited to 45 degrees and may be selected as appropriate.

In the example shown in FIG. 6, the total movement distance in the main scanning direction is determined by, for example, performing calculations according to the following Equation 5, and the total movement distance in the sub-scanning direction is determined by, for example, performing calculations according to the following Equation 6. Then, the total distance may be determined by, for example, performing calculations according to the following Equation 7.

$$\text{Total movement distance of recording head } 31 = 76 + (14 \times 8) = 188 \quad \text{Equation 5}$$

$$\text{Total movement distance of optical disc } 41 = 10 \times 8 = 80 \quad \text{Equation 6}$$

$$\text{Total distance} = 188 + 80 = 268 \quad \text{Equation 7}$$

In this manner, the total distance that the recording head and recording medium would move if printing were performed may be determined for a plurality of different image positions. For example, total distance may be determined as if the image 50 were rotated in a series of 45 degree steps and printing was performed at angular position relative to the original position (e.g., 0, 45, 90, and 135 degrees).

Figure 7:
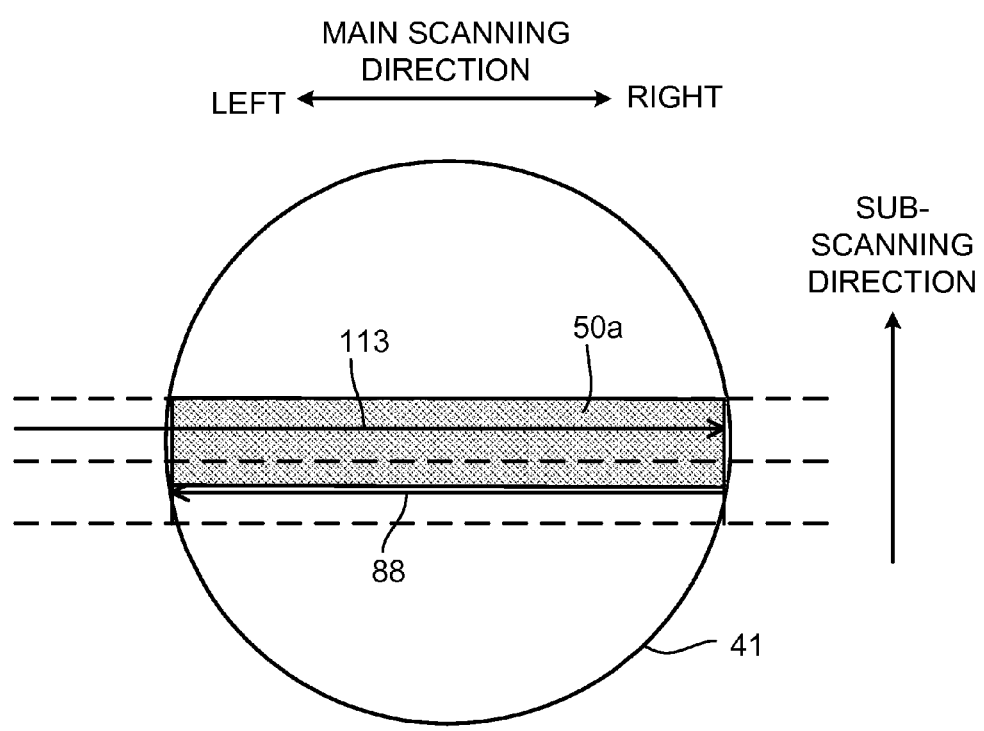
FIG. 7 is a schematic diagram illustrating a printing operation when rotating the image shown in FIG. 4 by a predetermined angle and printing the image.

FIG. 7 is a schematic diagram illustrating a printing operation when the image 50 is further rotated by a predetermined angle and printed on the label surface of the optical disc 41. In the example shown in FIG. 7, the image 50 is rotated clockwise by 135 degrees. Thus, the image 50 is parallel to the main scanning direction. In addition, the total movement distance in the main scanning direction is calculated by the following Equation 8, and the total movement distance in the sub-scanning direction is calculated by the following Equation 9. Then, the total distance is calculated by the following Equation 10.

$$\text{Total movement distance of recording head } 31 = 113 + 88 = 201 \quad \text{Equation 8}$$

$$\text{Total movement distance of optical disc } 41 = 10 \times 1 = 10 \quad \text{Equation 9}$$

$$\text{Total distance} = 201 + 10 = 211 \quad \text{Equation 10}$$

As is obvious from Equation 4, Equation 7, and Equation 10, even for the same image, the total distance is different depending on the rotation angle of the image.

Therefore, in order to shorten the time for printing on the label surface of the optical disc 41, the printer driver program causes the PC 1 to execute a rotation process of rotating an image by an angle that provides a short total distance as compared to that when the image is printed on the optical disc 41 without being rotated, and a printing process of causing the printer 2 to print the image rotated by the rotation process.

(7) Rotation Process and Printing Process

Figure 8:
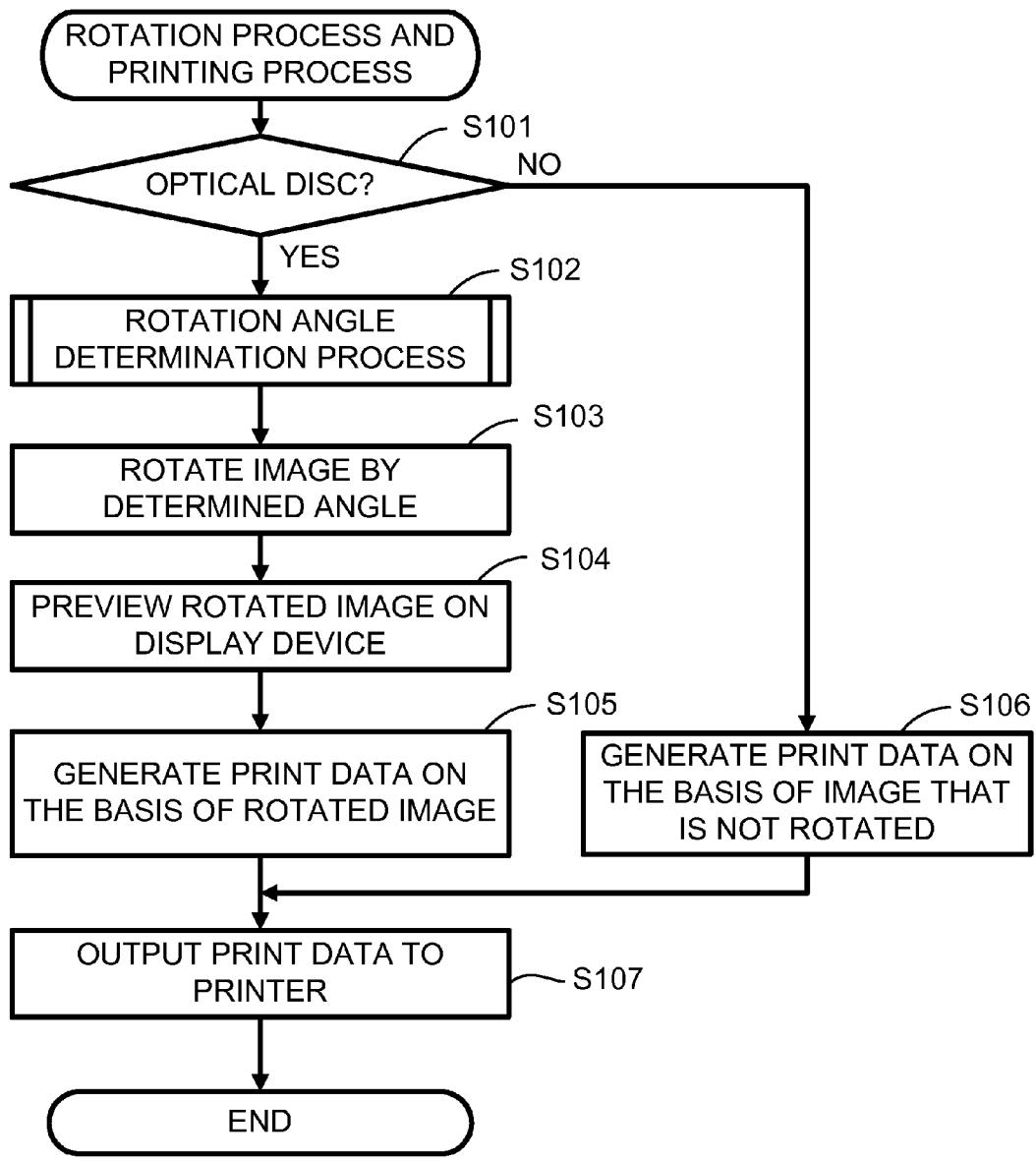
FIG. 8 is a flowchart illustrating flow of a rotation process and a printing process.

FIG. 8 is a flowchart illustrating flow of a rotation process and a printing process according to Embodiment 1. This process is started when a print instruction including an image that is an object to be printed is outputted from an application program through the operating system (OS) to the printer driver program.

Here, when printing an image, a user may request printing via a selection from a menu displayed by the application program. After the user requests printing, a print instruction is outputted from the application program through the OS to the printer driver program, and the type of a recording medium selected by the user is provided to the printer driver program.

When printing an image on a label surface of an optical disc, the user can request printing via a menu displayed by the label surface printing program. After the user requests printing through the label surface printing program, a print instruction is outputted to the printer driver program, and an optical disc is designated as a type of the recording medium.

At S101, the CPU 11 (hereinafter, referred to as "printer driver") that executes the printer driver program determines whether or not the designated type of recording medium is an optical disc. If so, the program proceeds to S102 When the type of recording medium is other than an optical disc (a non-optical-disc medium), the program proceeds to S106.

At S102, the printer driver executes a "rotation angle determination process" for determining an angle by which an image (the image included in the print instruction) is to be rotated. The "rotation angle determination process" will be described in detail below.

At S103, the printer driver rotates the image by the angle determined at S102. As described above, the image is rotated about a point on the image which is located at the center of the label surface of the optical disc 41.

At S104, the printer driver may display an image as if rotated by the angle relative to the original image position as a rotated image on the display device 17 to allow the image to be previewed. It should be noted that this previewing may not necessarily be performed.

At S105, the printer driver generates print data on the basis of the rotated image.

At S106, the printer driver generates print data on the basis of the image that is not rotated.

At S107, the printer driver outputs the generated print data to the printer 2.

In the process described above, S102 and S103 are an example of the rotation process, and S105 and S107 are an example of the printing process.

(8) Rotation Angle Determination Process

Figure 9:
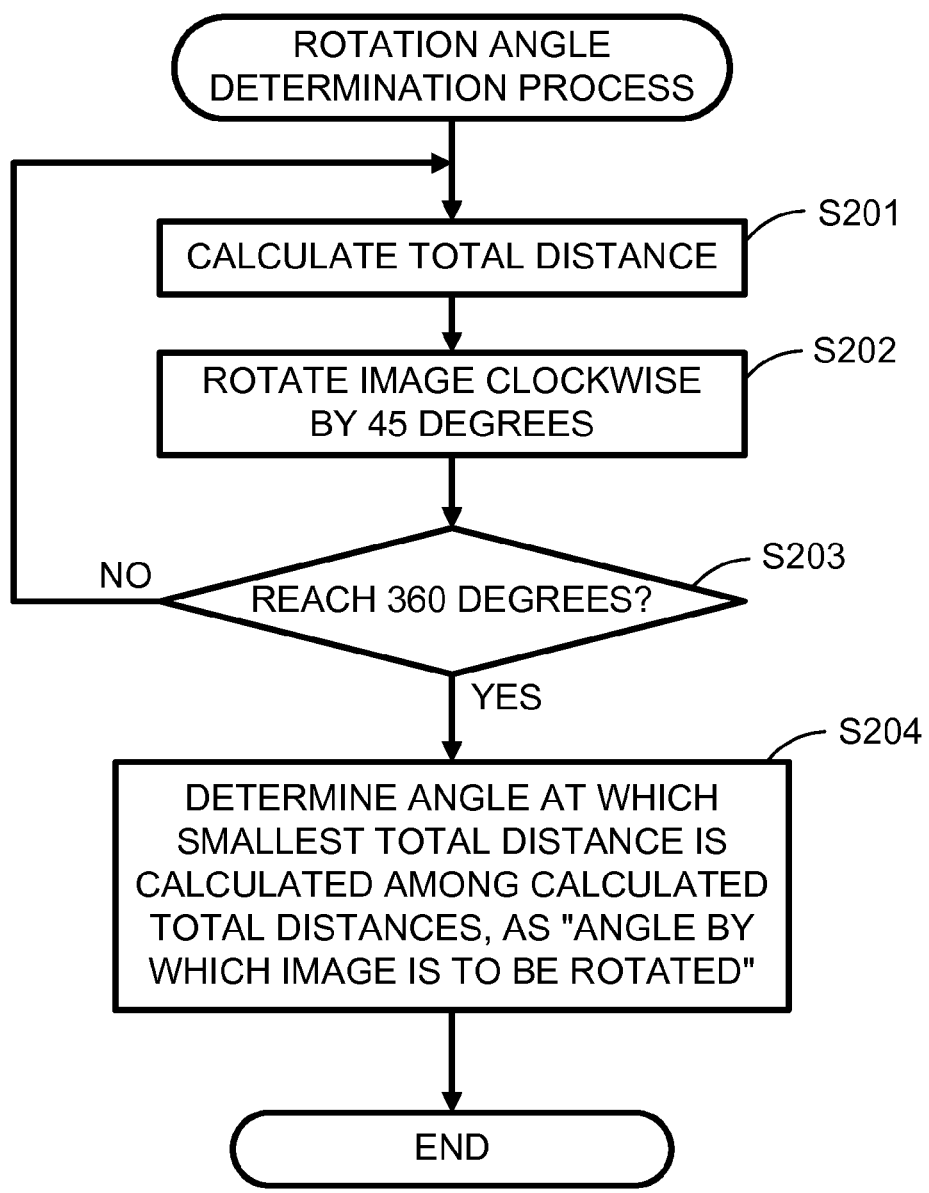
FIG. 9 is a flowchart illustrating flow of a rotation angle determination process.

FIG. 9 is a flowchart illustrating flow of the "rotation angle determination process" described above.

At S201, the printer driver analyzes the image to determines a total distance, if printing were performed with the image at an angle relative to its original position, and stores the angle by which the image and the determined total distance in RAM such that the angle is associated with the determined total distance.

A first determination process is performed when S201 is executed for the first time after this process is started, and the angle by which the image is rotated, that is the angle relative to the original position of the image, may be 0 degrees. Execution of S201 a second or further time can be considered as the performance of a second determination process.

At S202, the printer driver executes a first rotation process in which the image is rotated clockwise by 45 degrees.

At S203, the printer driver determines whether the image has been rotated 360 degrees. When the image has been rotated 360 degrees, the printer driver proceeds to S204.

When the image has not been rotated 360 degrees, the printer driver returns to S201 to repeat the same process.

At S204, the printer driver identifies the smallest total distance from the total distances calculated at S201, and determines the angle associated with the identified total distance (the angle at which the smallest total distance is determined), as an angle by which the image is to be rotated when printing is performed. In the examples of FIGS. 5 to 7, the total distance is the smallest in the example of FIG. 7 where the image 50 is rotated so as to be parallel to the main scanning direction. Thus, the rotation angle is determined as 135 degrees in the clockwise direction.

Here, the angle associated with the smallest total distance can be 0 degrees. In other words, the total distance for the case where the image is not rotated may be the smallest among the calculated total distances. In this case, the image is printed without being rotated.

(9) Advantages of Illustrative Embodiment

According to the printer driver program of Embodiment 1 described above, the image is rotated by the angle at which the total distance of the total movement distance by which the recording head 31 moves in the main scanning direction and the total movement distance by which the optical disc 41 moves in the sub-scanning direction becomes short as compared to that when the image is printed on the optical disc 41 without being rotated. Thus, the shortest printing time can be employed.

Further, according to the printer driver program, the image can be rotated in steps of 45 degrees, and the total distance can be calculated each time the image is rotated by 45 degrees, whereby the angle that provides a shorter total distance than that when the image is printed on the optical disc without being rotated can be determined.

Further, according to the printer driver program, the image can be rotated by the angle at which the smallest total distance is determined among the total distances that are determined by the second determination process (the process of rotating the image in steps of 45 degree and determining the total distances) and that are smaller than the total distance determined by the first determination process (the process of determining a total distance without rotating the image). Thus, the printing time can be further shortened.

Further, according to the printer driver program, when the recording medium is an optical disc having a circular label surface, an image is rotated about the point on the image which point is located at the center of the label surface when the image is printed on the label surface. Since the label surface is circular, even when the image is rotated, the result of printing is the same between before the rotation and after the rotation. Since the image is rotated in such a case, the same result of printing as that when the image is not rotated can be obtained while the printing time is shortened.

Further, according to the printer driver program, examples of types of recording medium that can be used include an optical disc and a non-optical-disc medium (non-disc-shaped medium) such as a print sheet. When the type of the recording medium is a non-optical-disc medium, the image is not rotated. Thus, when the recording medium is not an optical disc, a result of printing after rotating an image can be prevented from being changed from that before the rotation.

Embodiment 2

Next, another illustrative embodiment, Embodiment 2, will be described.

In Embodiment 1, the total distance is determined on the basis of the total movement distance of the recording head 31 and the total movement distance of the optical disc 41. In Embodiment 2, the total distance is determined on the basis of the total movement distance of the recording head 31, the total movement distance of the optical disc 41, and the number of times of reversing of the recording head 31.

The following Equation 11 is an equation for determining by calculating a total distance according to Embodiment 2.

$$\text{Total distance} = \text{total movement distance of recording head 31} + \text{total movement distance of optical disc 41} + \text{number of times of reversing times reversing coefficient} \quad \text{Equation 11}$$

The number of times of reversing is the number of times the recording head 31 reverses its direction at the edge of the image region, and for example, the number is seven in the example shown in FIG. 5 and one in the example shown in FIG. 7.

The reversing coefficient is a coefficient for converting the number of times of reversing into a movement distance. When the recording head 31 reverses its direction, the velocity of the recording head 31 decreases so as to be 0 at a position where the recording head 31 reverses its direction. After the velocity becomes 0, the recording head 31 accelerates again in the opposite direction. Thus, the movement distance by which the recording head 31 moves within a given time period is different from that when the recording head 31 moves without reversing its direction. When this difference is used as a reversing coefficient, the number of times of reversing can be converted into a distance.

Embodiment 2 is substantially the same in the other points as Embodiment 1.

According to the printer driver program according to Embodiment 2 described above, the total distance is determined in view of the number of times of reversing of the recording head 31. For example, even if the total distances that do not take into consideration the number of times of reversing are the same, the printing time in the case where the number of times of reversing is high is longer than that in the case where the number of times of reversing is low. According to the printer driver program according to Embodiment 2, since the total distance is determined in view of the number of times of reversing of the recording head 31, the angle at which the printing time is shortened can be determined more accurately than according to Embodiment 1.

Embodiment 3

Next, Embodiment 3 of the present invention will be described.

In Embodiment 2, the total distance is determined on the basis of the total movement distance of the recording head 31, the total movement distance of the optical disc 41, and the number of times of reversing of the recording head 31. In Embodiment 3, the total distance is determined on the basis of the total movement distance of the recording head 31, the moving velocity of the recording head 31, the total movement distance of the optical disc 41, the moving velocity of the optical disc 41, and the number of times of reversing of the recording head 31.

The following Equation 12 is an equation for determining a total distance by performing calculations according to Embodiment 3.

$$\text{Total distance} = \text{total movement distance of recording head 31} + \text{total movement distance of optical disc 41 times velocity coefficient} + \text{number of times of reversing times reversing coefficient} \quad \text{Equation 12}$$

The velocity coefficient is for converting the difference between the moving velocity of the recording head 31 and the moving velocity of the optical disc 41 into a distance. For example, if the moving velocity of the optical disc 41 is ½ times as fast as the moving velocity of the recording head 31, the distance by which the optical disc 41 having the same moving velocity as the moving velocity of the recording head 31 moves within a given time period is doubled.

On the other hand, for example, if the moving velocity of the optical disc 41 is twice as fast as the moving velocity of the recording head 31, the distance by which the optical disc 41 having the same moving velocity as the moving velocity of the recording head 31 moves within the same time period is ½ times.

In other words, when the ratio of the moving velocity of the recording head 31 and the moving velocity of the optical disc 41 (=moving velocity of recording head 31/moving velocity of optical disc 41) is used as a velocity coefficient, the difference between the moving velocity of the recording head 31 and the moving velocity of the optical disc 41 can be converted into a distance.

Embodiment 3 is substantially the same in the other points as Embodiment 1.

According to the printer driver program according to Embodiment 3 described above, the total distance is calculated in view of the moving velocity of the recording head 31 and the moving velocity of the optical disc 41. Thus, the angle at which the printing time is shortened can be determined more accurately than according to Embodiment 1.

Embodiment 4

Next, Embodiment 4 of the present invention will be described with reference to FIGS. 10 to 14.

Figure 10:
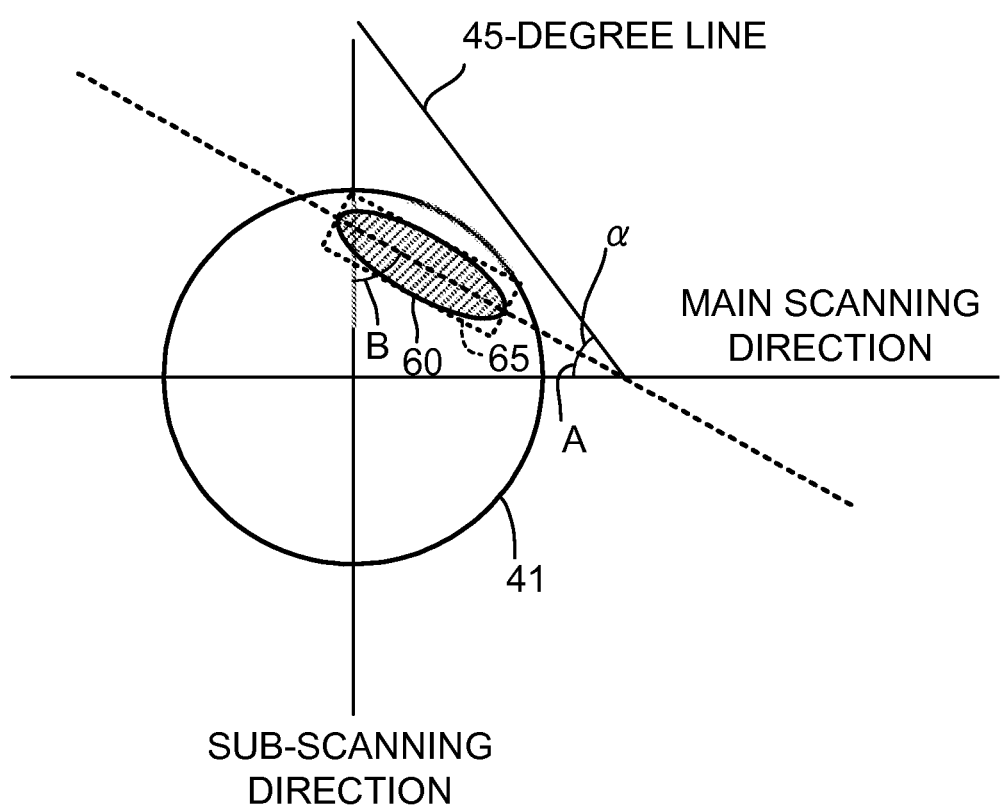
FIG. 10 is a schematic diagram illustrating an image, according to an illustrative embodiment, which is printed on a label surface without being rotated.
Figure 11:
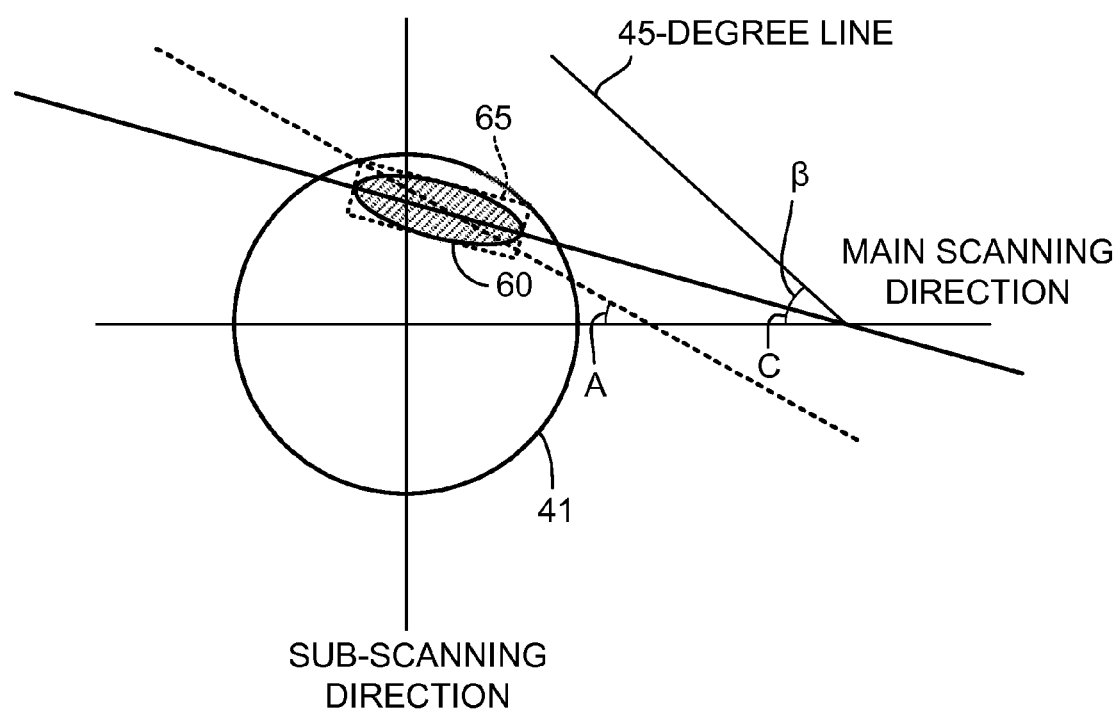
FIG. 11 is a schematic diagram illustrating an image that is rotated and printed on a label surface.
Figure 12:
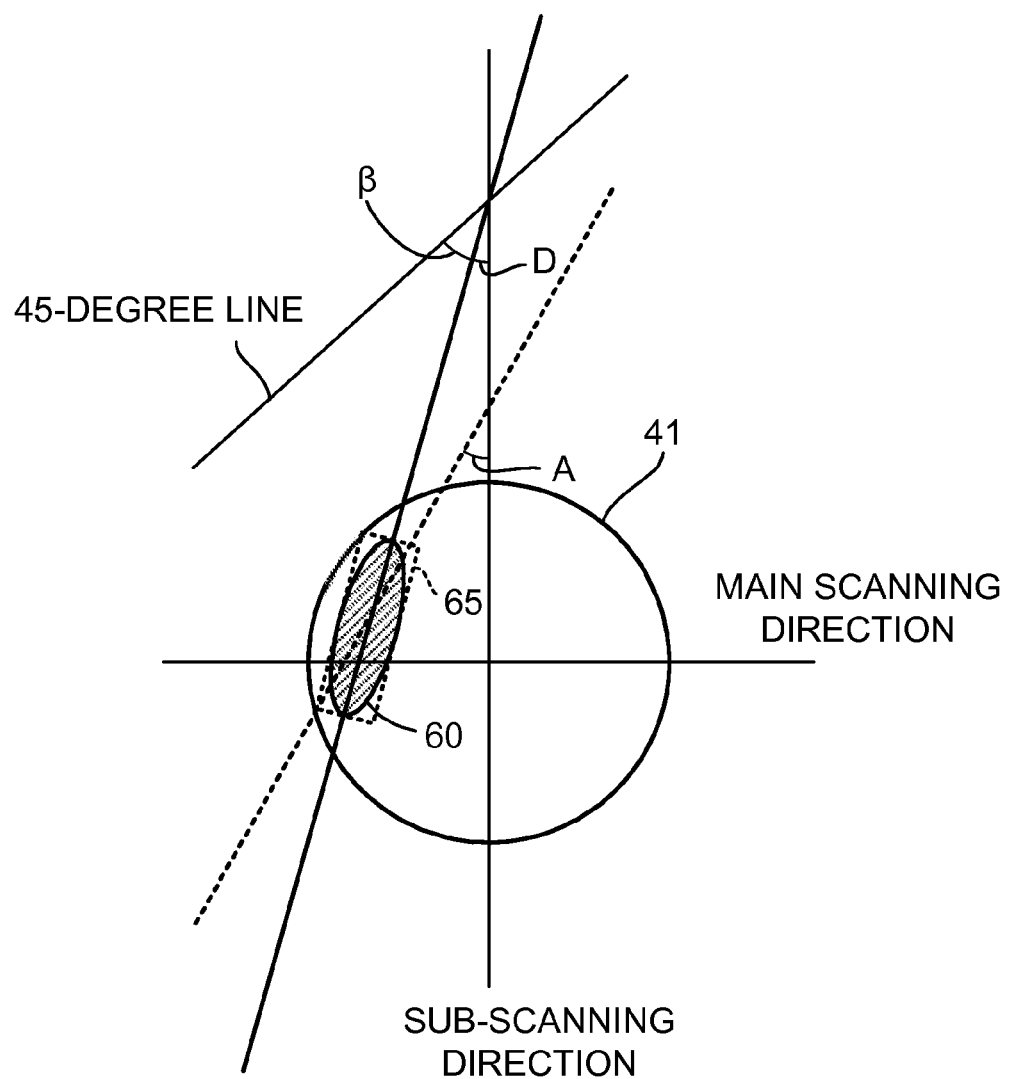
FIG. 12 is a schematic diagram illustrating an image that is rotated and printed on a label surface.

FIGS. 10 to 12 are schematic diagrams for explaining determination of an angle according to Embodiment 4. FIG. 10 illustrates the case where an image is printed on a label surface without being rotated. FIGS. 11 and 12 each illustrate the case where an image is rotated and printed on a label surface.

The total distance of a total movement distance of the recording head and a total movement distance of the optical disc is longest when a lengthwise axis direction of an image region 60 is inclined at 45 degrees relative to the main scanning direction and the sub-scanning direction. Here, the lengthwise axis corresponds to a line parallel to a long side of a quadrangle having a smallest area among imaginary quadrangles that are circumscribed about the image region 60. A quadrangle 65 indicated by a broken line in FIG. 10 is not part of the image region 60 but is a smallest imaginary quadrangle that is circumscribed about the image region 60.

Thus, when the image is rotated such that an acute angle β (see FIGS. 11 and 12) between the lengthwise axis direction of the image region 60 after the rotation and an imaginary line of 45 degrees is greater than an acute angle α (see FIG. 10) between the lengthwise axis direction of the image region 60 before the rotation and the imaginary line of 45 degrees, the total distance can be shortened.

In this case, the acute angle β can be made higher than the acute angle α when the following steps are taken.

First, as shown in FIG. 10, one of an acute angle A between the lengthwise axis direction of the image region 60 before the rotation and the main scanning direction and an acute angle B between the lengthwise axis direction of the image region 60 and the sub-scanning direction that is less than the other acute angle is set as a reference angle (the angle A is set as the reference angle in the illustrated example).

Then, the image is rotated by such an angle that an acute angle C between the lengthwise axis direction of the image region 60 after the rotation and the main scanning direction is less than the reference angle A as shown in FIG. 11, or the image is rotated by such an angle that an acute angle D between the lengthwise axis direction of the image region 60 after the rotation and the sub-scanning direction is less than the reference angle A as shown in FIG. 12.

By so doing, the acute angle β between the lengthwise axis direction of the image region 60 after the rotation and the imaginary line of 45 degrees can be made greater than the acute angle α between the lengthwise axis direction of the image region 60 before the rotation and the imaginary line of 45 degrees.

Here, when the acute angle C or the acute angle D is less than the reference angle A, the total distance is at least as small as compared to that before rotating the image. However, the closer the acute angle C is to 0 degrees, the smaller the total distance is.

Then, when the lengthwise axis direction of the image region 60 is parallel to the main scanning direction, the number of times of reversing becomes the smallest.

Figure 13:
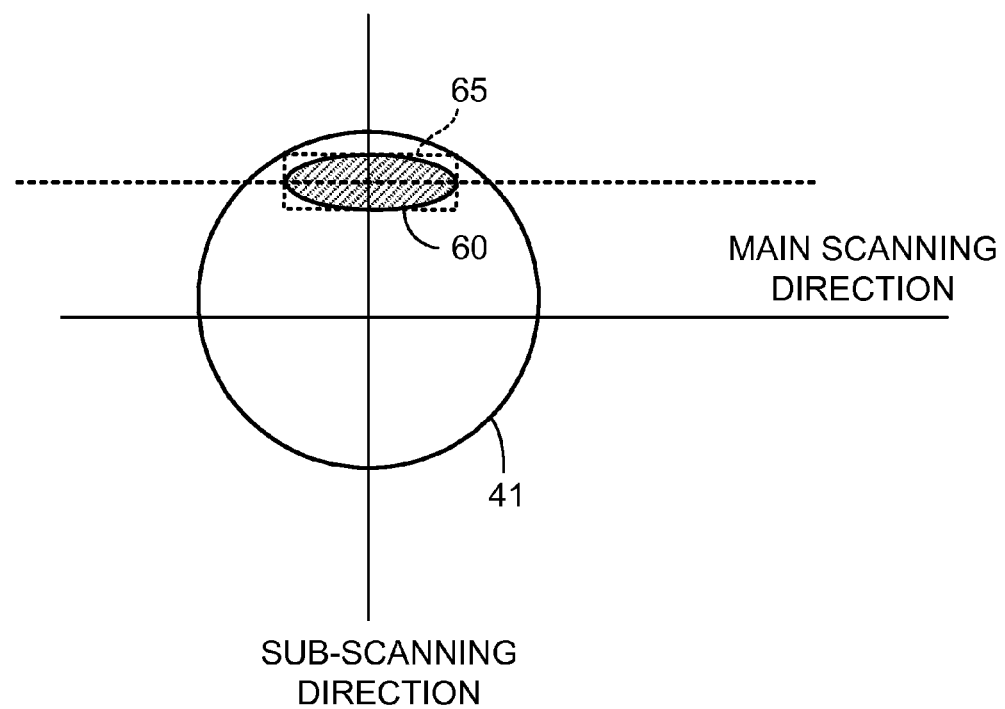
FIG. 13 is a schematic diagram illustrating an image that is rotated by such an angle that a lengthwise axis direction of an image region is parallel to a main scanning direction, and is printed on a label surface.

Thus, in Embodiment 4, the lengthwise axis direction of the image region 60 is identified, and the image is rotated by such an angle that the lengthwise axis direction is parallel to the main scanning direction as shown in FIG. 13.

Figure 14:
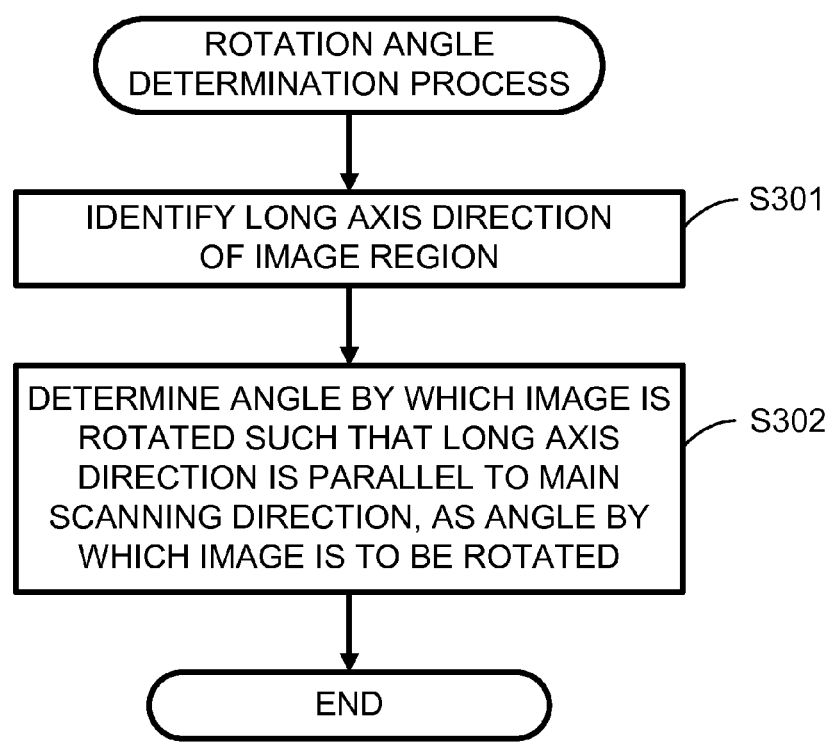
FIG. 14 is a flowchart illustrating flow of a rotation angle determination process.

FIG. 14 is a flowchart illustrating flow of a rotation angle determination process according to illustrative Embodiment 4.

At S301, the printer driver analyzes the image to identify the lengthwise axis direction of the image region.

At S302, the printer driver determines an angle by which the image is rotated such that the lengthwise axis direction identified at S301 is parallel to the main scanning direction (the angle A in the counterclockwise direction in the example shown in FIG. 10), as an angle by which the image is to be rotated.

According to the printer driver program of Embodiment 4 described above, the image is rotated such that the acute angle between the lengthwise axis direction of the image region after the rotation and the main scanning direction is less than the reference angle or such that the acute angle between the lengthwise axis direction of the image region after the rotation and the sub-scanning direction is less than the reference angle. Thus, the printing time can be shortened as compared to that when the image is printed on the optical disc 41 without being rotated.

Further, according to the printer driver program, since the image is rotated such that the lengthwise axis direction after the rotation is parallel to the main scanning direction, the printing time can be further shortened.

It should be noted that when the image region 60 is a square, two sides have the same length, and thus there are two lengthwise axis directions. In this case, either of the lengthwise axis directions may be selected.

Further, when there are a plurality of lengthwise axis directions, if the width in the sub-scanning direction when the image is rotated such that a lengthwise axis direction is parallel to the main scanning direction is different depending on the lengthwise axis direction, it is desired to select the lengthwise axis direction that provides a smallest width in the sub-scanning direction when the image is rotated such that the lengthwise axis direction is parallel to the main scanning direction. This is because there is the possibility that the number of times of reversing can be reduced further.

Other Embodiments

The present invention is not limited to the illustrative embodiments described in the above description and the drawings, and, for example, the following embodiments are also included within the technical scope of the present invention.

(1) In Embodiment 1 described above, the image is rotated in steps of 45 degrees, the total distances are determined, and the image is rotated by an angle at which the smallest total distance is determine. However, this angle need not be the angle at which the smallest total distance is determined, as long as it is an angle at which a total distance less than the total distance when the image is printed without being rotated is calculated.

(2) In Embodiment 1 described above, the image is rotated in steps of 45 degrees, the total distances are calculated, and the image is rotated by the angle at which the smallest total distance is calculated. However, this angle need not be an angle at which the printing time is shortened most. This is because the printing time may be shortened most when the image is rotated by 30 degrees.

Thus, the image may not be rotated in steps of a predetermined angle, the image may be analyzed to obtain an angle that provides a smallest total distance, and the image may be rotated by the angle that provides the smallest total distance.

(3) In Embodiment 3 described above, the total distance is determined on the basis of the total movement distance of the recording head 31, the moving velocity of the recording head 31, the total movement distance of the optical disc 41, the moving velocity of the optical disc 41, and the number of times of reversing of the recording head 31. The total distance may be determined without taking into consideration the number of times of reversing of the recording head 31. Specifically, the total distance may be determined by performing calculations according to the following Equation 13.

Total distance=total movement distance of recording head 31+total movement distance of optical disc 41 times velocity coefficient    Equation 13

(4) In Embodiment 4 described above, the image is rotated by such an angle that the lengthwise axis direction of the image region is parallel to the main scanning direction. However, the image may be rotated by such an angle that the lengthwise axis direction of the image region is parallel to the sub-scanning direction.

Further, as long as the acute angle between the lengthwise axis direction after rotation and the main scanning direction or the acute angle between the lengthwise axis direction after rotation and the sub-scanning direction is less than the reference angle, the image need not be rotated such that the lengthwise axis direction is parallel to the main scanning direction or the sub-scanning direction.

(5) In the illustrative embodiments described above, when the type of the recording medium is other than an optical disc, the image is not rotated. However, even when the type of the recording medium is other than an optical disc, the image may be rotated.

For example, an image region may be cut out from a print sheet for a certain purpose. When the image region is cut out, a result of cutting-out is the same even when the image region is printed on the print sheet at any angle. In this case, the printing time can be shortened by rotating and printing the image.

(6) In the illustrative embodiments described above, the image is rotated about the point on the image which is located at the center of the label surface of the optical disc 41. The image may be rotated about the central point of the image region, not about the point on the image which point is located at the center of the label surface.

This is because, for example, when the image is cut out from the print sheet as described above, a result of cutting-out is the same even if the image is rotated about the central point of the image region.

In addition, as long as the image is rotated by an angle that provides a short total distance as compared to that when the image is printed without being rotated, which point the image is rotated about is selectable as appropriate in the range where the intended printing result is obtained.

(7) In the illustrative embodiments described above, the printer driver program is described as a printing program. However, the printing program may be, for example, a label surface printing program. In other words, a label surface printing program may execute the rotation process. In this case, a process in which a label surface printing program outputs a print instruction (a print instruction including a rotated image) to the printer driver program is an example of a printing process.

(8) In the illustrative embodiments described above, the personal computer is described as an information processing apparatus. However, the information processing apparatus may be a portable information terminal or a mobile phone.

(9) In the illustrative embodiments described above, the information processing apparatus executes the rotation process. However, the printer may execute the rotation process. The printer that executes the rotation process is an example of a printing apparatus.

It should be noted that when the printer executes the rotation process, the control unit 21 of the printer may execute the rotation process and the printing process, or these processes may be executed by different CPUs or by an ASIC or another circuit.

(10) The "total movement distance" described in the embodiments described above can be rephrased as "total moving time" or "correlation value correlated with the total moving time". This is because the total moving time increases as the total movement distance increases, the total moving time increases as the number of times of reversing increases, or the total moving time increases, for example, as the moving velocity of the optical disc 41 decreases.

According to certain aspect, a storage medium may be provided having stored therein a printing program that is executed by an information processing apparatus communicatively connected to a printing apparatus that includes a recording head transfer section for reciprocating, in a main scanning direction, a recording head for discharging ink toward a recording medium, and a recording medium transfer section for moving the recording medium in a sub-scanning direction orthogonal to the main scanning direction. The printing program, when executed, causes the information processing apparatus to execute:

a rotation process of rotating an image by such an angle that a total time of a total movement time for which the recording head moves in the main scanning direction during a period from start of movement of the recording head to end of discharging the ink toward the recording medium and a total movement time for which the recording medium moves in the sub-scanning direction during the period is short as compared to that when the image is printed on the recording medium without being rotated; and a printing process that causes the printing apparatus to print the image rotated by the rotation process.

What is claimed is:

1. A non-transitory storage medium having stored therein a printing program for use by an information processing apparatus communicatively connected to a printing apparatus that includes a recording head transfer section for reciprocating, in a main scanning direction, a recording head for discharging ink toward a recording medium, and a recording medium transfer section for moving the recording medium in a sub-scanning direction orthogonal to the main scanning direction, wherein the printing program, when executed by the information processing apparatus, performs:

determining a first total movement distance of an image at a first angle relative to an original position according to a first movement distance by which the recording head would move in the main scanning direction during a period from a start of movement of the recording head to an end of discharging the ink toward the recording medium if printing were performed and a second movement distance by which the recording medium would move in the sub-scanning direction during the period if printing were performed, determining a second total movement distance of an image at a second angle, different from the first angle, relative to the original position of the image according to a first movement distance by which the recording head would move in the main scanning direction during a period from a start of movement of the recording head to an end of discharging the ink toward the recording medium if printing were performed and a second movement distance by which the recording medium would move in the sub-scanning direction during the period if printing were performed, determining whether the second total movement distance is less than the first total movement distance, and causing the printing apparatus to print the image at the position of the second angle in a case that the second total movement distance is less than the first total movement distance.

2. The non-transitory storage medium according to claim 1, wherein the printing program, when executed by the information processing apparatus, performs causing the printing apparatus to print the image without rotation in a case that the second total movement distance is not less than the first total movement distance and the first angle is 0 degrees.

3. The non-transitory storage medium according to claim 1, wherein the determining the first total movement distance includes calculating the first movement distance, the second movement distance, and a number of times that the recording head would be reversed if printing were performed, and the determining the second total movement distance includes calculating the first movement distance, the second movement distance, and a number of times that the recording head would be reversed if printing were performed.

4. The non-transitory storage medium according to claim 1, wherein the determining the first total movement distance is based on the first movement distance, a moving velocity of the recording head if printing of the image were performed, the second movement distance, and a moving velocity of the recording medium if printing of the image were performed, and the determining the second total movement distance is based on the first movement distance, a moving velocity of the recording head if printing of the image were performed, the second movement distance, and a moving velocity of the recording medium if printing of the image were performed.

5. The non-transitory storage medium according to claim 1, wherein causing the printing apparatus to print the image includes rotating the image about a point on the image located at a center of a printing surface of the recording medium in a case that the image is printed on the printing surface and the printing surface is circular.

6. The non-transitory storage medium according to claim 1, wherein the printing program, when executed by the information processing apparatus, performs determining whether the recording medium is an optical disc prior to determining the first total movement distance and the second total movement distance; and causing the printing apparatus to print the image without rotation in a case that the recording medium is not an optical disc.

7. The non-transitory medium according to claim 1, wherein the printing program, when executed by the information processing apparatus, performs determining a third total movement distance of an image at a third angle, different from the first and second angles, relative to the original position of the image according to a first movement distance by which the recording head would move in the main scanning direction during a period from a start of movement of the recording head to an end of discharging the ink toward the recording medium if printing were performed and a second movement distance by which the recording medium would move in the sub-scanning direction during the period if printing were performed, wherein the determining whether the second total movement distance is less than the first total movement distance further includes determining that, the second total movement distance is less than the third total movement distance, and wherein causing the printing apparatus to print the image at the position of the second angle occurs in a case that the second total movement distance is less than the first total movement distance and the third total movement distance.

8. A printing apparatus comprising:

a printing unit including a recording head transfer section for reciprocating, in a main scanning direction, a recording head for discharging ink toward a recording medium, and a recording medium transfer section for moving the recording medium in a sub-scanning direction orthogonal to the main scanning direction; and a control unit for controlling the printing unit to print an image on the recording medium, wherein the control unit executes operations including:

determining a first total movement distance of an image without rotation according to a first movement distance by which the recording head would move in the main scanning direction during a period from a start of movement of the recording head to an end of discharging the ink toward the recording medium if printing were performed and a second movement distance by which the recording medium would move in the sub-scanning direction during the period if printing were performed, determining a second total movement distance of an image with rotation by an angle according to a first movement distance by which the recording head would move in the main scanning direction during a period from a start of movement of the recording head to an end of discharging the ink toward the recording medium if printing were performed and a second movement distance by which the recording medium would move in the sub-scanning direction during the period if printing were performed,
determining whether the second total movement distance is less than the first total movement distance, and
causing the printing apparatus to print the image with rotation by the angle in a case that the second total movement distance is less than the first total movement distance.

\* \* \* \* \*